United States Patent [19]

Bouchard

[11] 4,199,329
[45] Apr. 22, 1980

[54] PROCESS AND APPARATUS FOR THE REMOVAL OF VAPORIZED CONTAMINANTS FROM CLOSED GAS SYSTEM

[75] Inventor: John R. Bouchard, Canton, Mass.

[73] Assignee: Northrop Corporation, Los Angeles, Calif.

[21] Appl. No.: 962,135

[22] Filed: Nov. 20, 1978

[51] Int. Cl.² .................................................. B01D 57/00
[52] U.S. Cl. ................................................ 55/17; 55/1;
55/407; 73/488; 74/5 R; 74/5.7; 277/1;
308/122
[58] Field of Search .................. 55/1, 17, 57, 309, 310,
55/391, 406, 407, 447, 467; 73/488, 514; 308/9,
121, 122, DIG. 1; 277/1; 74/5 R, 5.7

[56] References Cited

U.S. PATENT DOCUMENTS

| | | | |
|---|---|---|---|
| 940,885 | 11/1909 | Mazza | 55/17 X |
| 2,822,223 | 2/1958 | Offen | 308/122 |
| 2,926,898 | 3/1960 | Taylor | 73/514 X |
| 2,940,318 | 6/1960 | Adams et al. | 74/5 R |
| 3,082,009 | 3/1963 | Whitley et al. | 277/1 |
| 3,129,037 | 4/1964 | Ott | 308/121 |
| 3,303,485 | 2/1967 | Lee | 55/1 X |
| 3,626,664 | 12/1971 | Hoffstrom | 55/17 X |
| 3,631,423 | 12/1971 | Groom | 55/17 X |
| 3,721,479 | 3/1973 | Rasnick et al. | 308/DIG. 1 |
| 3,724,181 | 4/1973 | Benson, Jr. | 55/1 X |
| 3,857,687 | 12/1974 | Hamilton et al. | 55/407 X |
| 3,982,441 | 9/1976 | Widner | 74/5.7 |
| 3,985,034 | 10/1976 | Widner | 74/5.7 |
| 4,041,779 | 8/1977 | Greb | 308/DIG. 1 |

FOREIGN PATENT DOCUMENTS 604843 9/1978 Switzerland .............................. 55/17

*Primary Examiner*—Richard L. Chiesa
*Attorney, Agent, or Firm*—Kenway & Jenney

[57] ABSTRACT

An eliminator of vaporized contaminants from gas in a closed system in which high pressure gas is subjected to a substantially adiabatic expansion with accompanying temperature drop at a point where the contaminants cannot cause problems. In the specific case of a gas bearing, contaminants which normally condense in the gap between bearing surfaces are caused to condense at points well removed from the bearing gap where they cannot cause failure of the gas bearing. A remotely located expansion chamber or zone is created and it may include a restricting orifice at the inlet to which gas pressure is relatively high and at the outlet of which pressure is significantly lower. The pressure drop is accompanied by a comparably large decrease in temperature to a point at which the vaporized contaminants condense. A filter may be included at or adjacent to the outlet to trap the condensed contaminants.

7 Claims, 5 Drawing Figures

FIG. 1
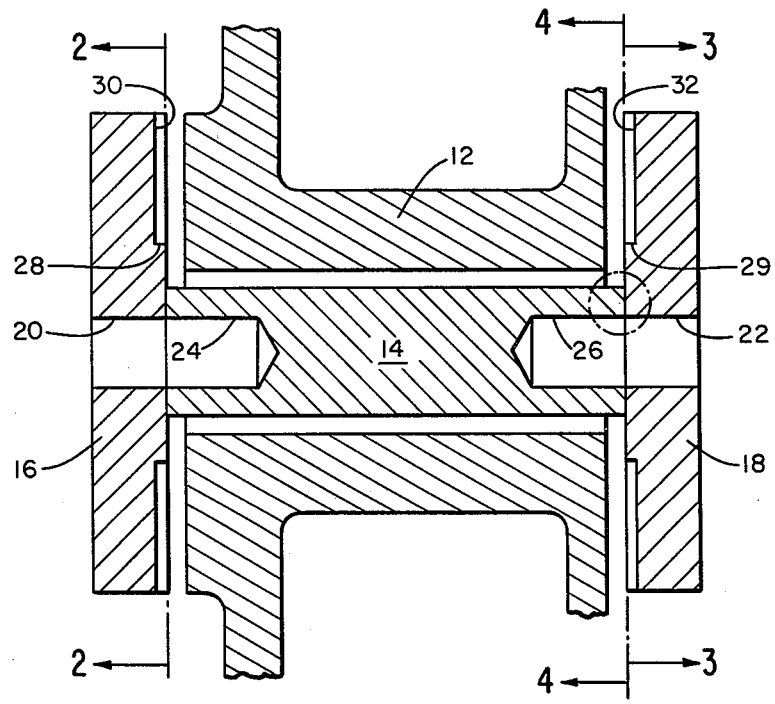
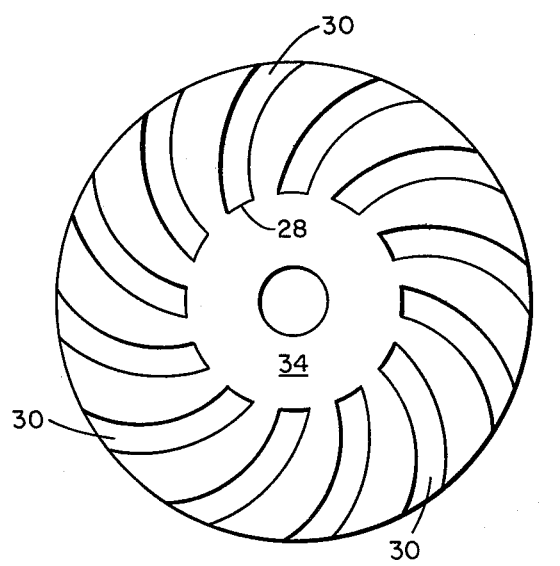
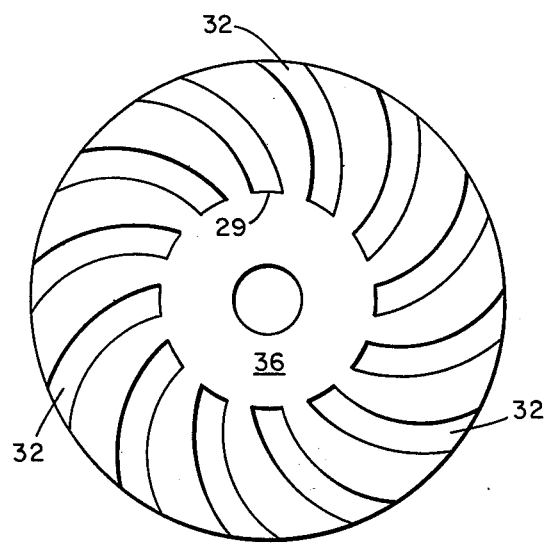
FIG. 2
FIG. 3

FIG. 5
FIG. 4
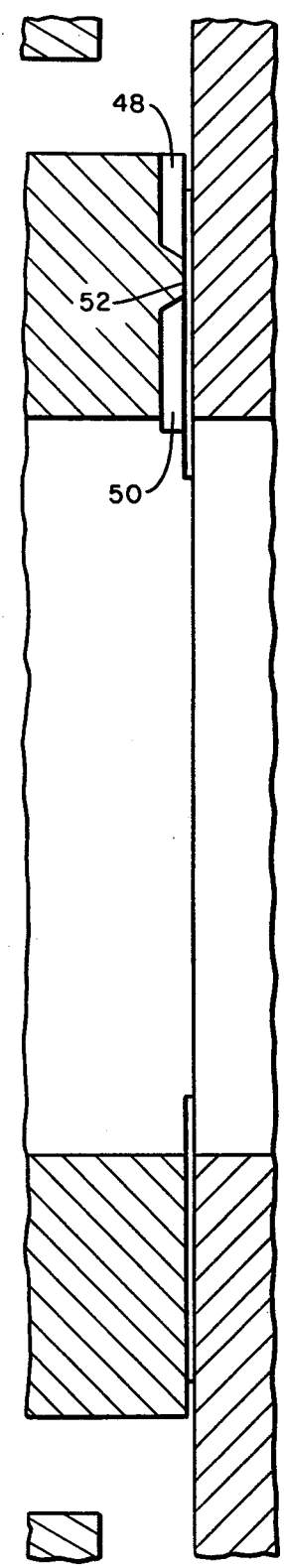
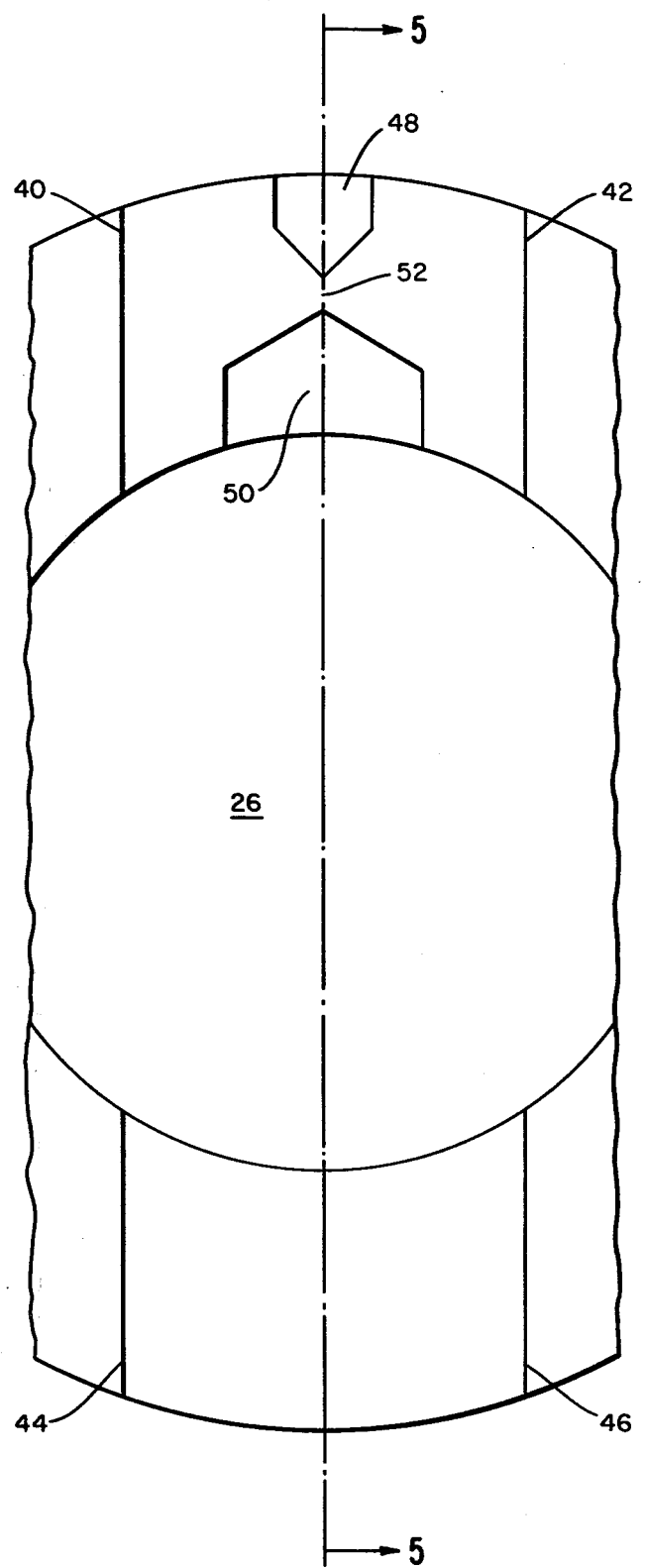

PROCESS AND APPARATUS FOR THE REMOVAL OF VAPORIZED CONTAMINANTS FROM CLOSED GAS SYSTEM

BACKGROUND OF THE INVENTION

In any closed gas system having working areas where vaporized contaminants can condense and cause difficulties, it is desirable to remove those contaminants or to condense them out at a point or at points where they do not deleteriously affect the operation of the system. Gas bearings frequently involve the use of closed gas systems and are particularly subject to problems arising from contaminant deposition in critical areas. In most gas bearings, the adjacent faces of a normally stationary element and a normally rotatable element have matching contours and are assembled closely together leaving only a narrow space between the two as a bearing gap to accommodate the bearing gas.

In sealed instruments containing a float gas, the gas at the float ambient pressure may be captured and caused to flow inwardly at increasing pressure toward the bearing gap by grooves or similar geometric configurations formed adjacent the bearing gap on one of the confronting surfaces of the stationary or rotating elements. One design for achieving such bearing pressures in floated gyros is known as the Whipple spiral, grooves being formed on the surfaces of such elements as the thrust pads or the shaft about which the inertial element of the gyro turns.

Although the basic hydrodynamic gas spin bearing theory is sound and various systems for introducing gas at relatively high pressure into the bearing gap have performed adequately, certain practical problems have been encountered. One of the more common difficulties derives from the fact that vaporized contaminants are inevitably present in the bearing gas. In the particular case of floated gyros, the contaminants may emanate from many sources, including the housing and components of the instrument but especially from the organic insulating material, cements, and impregnants used in the manufacture of the stator of the drive motor commonly used in gyro instruments. Condensation of these contaminants takes place in or adjacent to the bearing gap because the ability of the float gas to retain contaminants in a vaporized state is substantially lowered in those areas where the gas is at high pressure as compared to other areas of low pressure such as those at ambient float gas pressure. In gas bearing systems, the obvious result of the condensation of such foreign material is short bearing life.

Similarly, the deposition or condensation of vaporized contaminants in critical working areas of other closed gas systems is a source of trouble and shortened life. The present invention has as its general object the elimination of vaporized contaminants from closed gas systems by compression/expansion techniques. A more specific object and application of the invention concerns the extension of gas bearing life by the reduction of damage and failure caused by condensation of vaporized contaminants in the bearing gap.

SUMMARY OF THE INVENTION

The underlying concept of the present invention derives from the laws of gases which postulate that vaporized materials carried by a gas will not be retained in the same quantities if the gas pressure is increased or the gas temperature is reduced. In closed gas systems having critical or working areas where deposited contaminants can cause problems the objects of the invention are realized by the creation of a preferred location for condensation of vaporized contaminants rather than in those critical areas. In a specific system embodying the present invention, gas for a bearing gap is passed through a restriction at the entry to which the gas pressure is at a relatively high level. At the other side of the restriction a relatively large zone or chamber is provided to permit the gas to expand with an accompanying temperature drop of significant proportions. The expansion of the gas need not be adiabatic, but optimum results are had if the expansion is substantially adiabatic.

As a result of the temperature drop, contaminant vapors being carried by the bearing gas condense preferentially in the expansion zone or chamber where they can have no deleterious effects upon the bearing. In some instances, it is desirable that a filter be provided to trap and retain the condensed contaminants in or adjacent to the enlarged volume.

Preferred embodiments of the present invention are illustrated in the attached drawing in which:

BRIEF DESCRIPTION OF THE DRAWING

FIG. 1 is a fragmentary sectional view of the rotor or "wheel", shaft and thrust pad assembly of a gyroscopic instrument in which gas spin bearings are utilized;

FIGS. 2 and 3 are views taken along the lines 2—2 and 3—3 respectively of FIG. 1 illustrating the thrust pad configuration for pressurizing gas for the bearing;

FIG. 4 is a detailed view of a specific expansion system useful in eliminating contaminants; and FIG. 5 is a view taken along the line 5—5 of FIG. 4 illustrating further details of the specific expansion system.

DESCRIPTION OF PREFERRED EMBODIMENT

It has previously been noted that the invention is applicable generally to any closed gas system where it is necessary or desirable to maintain the gas contaminant-free or to prevent the deposition of contaminants in critical areas. The invention is presently found to be of greatest value when applied to gas bearings, particularly in the field of instrumentation and especially in gyros and accelerometers utilizing gas spin bearings. In FIG. 1, only a gyro wheel and its associated support for rotation are fragmentarily illustrated because it is the area and these components which form the background for this specific form of the present invention. Despite the simplified showing, however, the wheel and its support as well as the rotary drive components are usually enclosed in a shell which may in turn be enclosed with other gyro components in an outer case which serves to isolate the instrument from the external environment.

The wheel 12, which usually carries windings (not shown) forming part of its rotary drive motor, is mounted for rotation about a shaft 14. In the case of a miniature rate-integrating gyro having a hydrodynamic gas spin bearing, the speed of rotation of the wheel typically is of the order of 6,000 to 120,000 rpm.

At the ends of the shaft are thrust pads 16 and 18 which after proper preparation are permanently attached to the shaft 14. They are generally disk-shaped and have central openings 20 and 22 which are continuations of end bores 24 and 26 in the shaft 14.

As is best seen in FIGS. 2 and 3, the inner faces of the thrust pads 16 and 18 are symmetrically spirally grooved from their outer peripheries to points lying in circles 28 and 29 of diameter slightly greater than that of the openings 20 and 22 respectively. The grooves 30 on the inner face of the thrust pad 16 and the grooves 32 on the inner face of the thrust pad 18 respectively are pressure grooves commonly of the type known as Whipple spirals and are visible in FIGS. 1, 2 and 3. Because the sets of spiral grooves terminate at the circles 28 and 29, respectively, a dam 34 is formed on the inner face of the thrust pad 16 and a similar dam 36 is formed on the inner face of the thrust pad 18. It will be further noted that the spiral grooves are so formed that the inner faces of the two thrust pads are mirror images of one another to provide proper interaction for pressurizing float gas to serve as bearing gas. As is known in the art and explained further below, the float gas is increased in pressure as it is captured and moved inwardly by the spiral grooves toward the dams 34 and 36.

At the end of the shaft 14 in the area encircled on FIG. 1, a pressure bypass and gas expansion zone is created as may be better seen and understood by reference to FIGS. 4 and 5. The shaft end is prepared by sputtering or lapping the shaft end between the lines 40 and 42. At the same time, for reasons explained below, an opposite shaft end area between the lines 44 and 46 may also be similarly lapped out. In a particular design, the depth of cut may be about $60\mu''$ (0.000060''), and the width about 0.061''. The length of cut between the central bore 26 and the outer periphery of the shaft end is approximately 0.034''.

A high pressure chamber 48 is formed in the area centrally disposed between the lines 40 and 42 by the further removal of material at the shaft end to a depth of the order of 0.004''. The high pressure chamber may be about 0.0147'' wide. A low pressure chamber 50, communicating with the bore 26, also about 0.004'' in depth and 0.0291'' in width, is similarly formed by removal of material in the lapped area of the shaft end. Between the high and low pressure areas a dam 52 the length of which may be of the order of 0.0047'' at its narrowest point is left after the formation of the two chambers.

Reverting to FIG. 1, it may be seen that rotation of the wheel 12 on the shaft 14 and relative to the thrust pads 16 and 18 causes the float gas present in the enclosure to interact with the spiral grooves. Pressure is built up as the effective radius of the grooves decreases and it is maximum in the vicinity of the circles 28 and 29 defined by the inner ends or bases of the spiral grooves. The area between the circular base of the spiral grooves and the entry between the inner diameter of the wheel 12 and the shaft 14 is known conventionally as the gas bearing dam. It is in this area where serious deposition of contaminants begins because at the relatively high pressure, the float gas is incapable of retaining as much vaporized contaminants as it can at lower pressures in other areas.

The pressure of the float gas in the chamber 48 is essentially equal to that built up in the gas bearing due to its location adjacent the bearing gap. On the other hand, the pressure in the chamber 50 is essentially equal to the ambient float pressure due to its communication with the opening 26 which is aligned with the opening 22 in the thrust pad 18. The flow restricting dam 52 is relatively narrow and the radical pressure drop between the chambers causes a significant temperature drop and contaminant vapor is condensed out of the float gas in and adjacent the chamber 50.

With the dimensions cited above, and a pressure of 73 psia and temperature of 135° F. in the high pressure chamber 48 and a pressure of 37 psia in the low pressure chamber 50, pure adiabatic expansion would cause the temperature of the gas to drop to about 29° F. With such a drop in the temperature of the gas, the chamber 50 becomes a preferred point of deposition of vapors contaminating the gas where they cause no harm to the bearing. The size or configuration of the chamber is not critical. What is important is that a restriction or orifice be formed, like the restricting dam 52, either as a bypass or in series with the bearing gap, to obtain a pressure drop greater than that across the gas bearing dam to protect those critical areas where contaminant deposition cannot be tolerated.

In the preferred embodiment shown and described, pressure is generated by the grooves on one or both thrust pads fixed to the ends of the shaft. The pressure need not be so generated; in fact, the grooves may be formed upon or adjacent the stationary shaft, relative motion between those elements and the rotating inertial element being the operative mechanism to generate the required pressure. Alternatively, the grooves may be formed on only a single thrust pad, and the thrust pad or pads may be mounted on the periphery of the shaft rather than at its ends.

In some circumstances, a separate mechanism for generating pressure may be unnecessary because gas at relatively high pressure may be already available. If so, a bleed mechanism comparable to that described can be incorporated either as a bypass or in series with the bearing gap to obtain the desired pressure drop and accompanying temperature drop to condense contaminants out of the gas in the system at points where the contaminants can cause no harm. Moreover, in this or the other disclosed system, a filter made, for example, of a sintered metal or wire mesh can be disposed in or adjacent to the low pressure chamber such as chamber 50 where the condensation occurs.

Furthermore, as in the case of certain spherical or conical bearings, there may be no thrust pads. In such designs, if no float gas at elevated pressures is available, spiral grooves may be formed on the stationary or rotating surfaces to generate the necessary pressure for the gas bearing and an expansion chamber in series with or bypassing the gas bearing may be formed to create the desired alternative condensation and deposition point for vaporized contaminants in the gas.

Throughout the description above reference has been made to "high" or "low" pressures. These terms are only relative, however, to one another. For example, in a sealed instrument float ambient pressure may range from less than one atmosphere to several atmospheres.

The method or system by which gas at relatively high pressures is made available for gas bearings is not a part of the present invention. The present invention is concerned with the removal of vaporized contaminants from gas in closed gas systems such that those contaminants can be deposited at points where their deposition does not deleteriously affect that system.

What is claimed is:

1. In a closed gas system wherein said gas is generally at a given temperature and contains vaporized contaminants, said system including critical areas subject to damage from contaminants being deposited from said gas due to relatively high pressures of said gas existing thereabout, the method of preventing deposition of said contaminants in said critical areas which comprises the step of reducing the pressure of said gas from said relatively high pressure to a relatively low pressure at a point remote from said critical areas, said gas expanding at said point to attain a temperature below said given temperature at which said vaporized contaminants condense from said gas and are deposited at said point.

2. In a closed gas system wherein said gas contains vaporized contaminants, said system including critical areas subject to damage from contaminants being deposited from said gas due to relatively high pressures of said gas existing thereabout, the method of preventing deposition of said contaminants in said critical areas which comprises the steps of passing said gas at a given temperature and relatively high pressure from a first zone at approximately said relatively high pressure to a second zone remote from said critical areas, said gas expanding at said second zone to attain a relatively low pressure and a temperature below said given temperature at which said vaporized contaminants condense from said gas and are deposited at said second zone.

3. In a closed gas system wherein said gas contains vaporized contaminants, said system including critical areas subject to damage from contaminants being deposited from said gas due to relatively high pressures of said gas existing thereabout, the method of preventing deposition of said contaminants in said critical areas which comprises the steps of passing said gas at a given temperature and relatively high pressure from a first relatively small chamber at approximately said relatively high pressure into a second relatively large chamber, said second chamber being remote from said critical areas, said gas expanding in said second chamber to attain a relatively low pressure and a temperature below said given temperature at which said vaporized contaminants condense from said gas and are deposited in said second chamber.

4. In a closed gas system wherein said gas is generally at a given temperature and contains vaporized contaminants, said system including critical areas wherein deposition of said contaminants because of local relatively high pressure cannot be tolerated, the combination of means of providing said gas at said relatively high pressure communicating with said critical areas and means disposed adjacent said critical areas forming a relatively low pressure expansion zone, said last-mentioned means also being communication with said means for providing gas at said relatively high pressure whereby said gas expands in said zone lowering the temperature of said gas therein to a point below said given temperature at which said vaporized contaminants condense out of said gas.

5. In a gas spin bearing assembly which includes a first stationary member having at least a portion thereof of a predetermined contour and a second member movable relative to said first stationary member, said second member having at least a portion thereof substantially conforming to and closely spaced from said portion of predetermined contour of said first stationary member to form a relatively narrow bearing gap between said members, the combination of a source of gas at relatively high pressure containing vaporized contaminants, said source being in communication with said bearing gap whereby gap is forced therein, and means disposed adjacent said bearing gap forming a relatively low pressure expansion chamber also in communication with said source of gas at relatively high pressure whereby said gas expands in said expansion chamber lowering the temperature of said gas therein to a point at which said vaporized contaminants condense out of said gas and are deposited in said expansion chamber.

6. In a gas spin bearing assembly as defined in claim 5, the combination which includes a sealed housing for said assembly and a quantity of float gas disposed in said housing, said second member being rotatable relative to said first member, said source of gas at a relatively high pressure comprising spiral grooves formed in a surface of one of said members confronting a conforming surface of the other of said members whereby the pressure of said float gas is increased by the interaction of said spiral grooves therewith during relative rotation of said members, and a gas bearing dam disposed between said spiral grooves and said bearing gap.

7. In a gas spin bearing assembly as defined in claim 6, the combination wherein said means disposed adjacent said bearing gap forming a relatively low pressure expansion chamber includes a restriction across which the pressure drop is greater than that across said gas bearing dam.

* * * * *

UNITED STATES PATENT AND TRADEMARK OFFICE
CERTIFICATE OF CORRECTION

PATENT NO. : 4,199,329
DATED : April 22, 1980
INVENTOR(S) : John R. Bouchard

It is certified that error appears in the above–identified patent and that said Letters Patent are hereby corrected as shown below:

Claim 4, Col. 6, line 2, after "being" insert --in--.

Claim 5, Col. 6, line 19, after "whereby" delete "gap" and insert therefor --gas--.

Signed and Sealed this

Fifteenth Day of July 1980

[SEAL]

Attest:

SIDNEY A. DIAMOND

Attesting Officer — Commissioner of Patents and Trademarks